United States Patent [19]
Takano

[11] Patent Number: 6,079,859
[45] Date of Patent: Jun. 27, 2000

[54] AUTOMOTIVE INTERIOR LAMP ASSEMBLY HAVING POLYPROPYLENE BODY, A LAMP AND SWITCH, AND TRANSPARENT/TRANSLUCENT POLYPROPYLENE AND/OR POLYCARBONATE COVER WITH IZOD IMPACT VALUES

[76] Inventor: Tsunesuke Takano, c/o Kabushiki Kaisha T AN T, 30-14, Higashi-Ikebukuro 1-chome, Toshimaku, Tokyo, Japan

[21] Appl. No.: 09/013,200

[22] Filed: Jan. 26, 1998

[30] Foreign Application Priority Data

Jul. 15, 1997  [JP]  Japan ..................................... 9-189809

[51] Int. Cl.[7] ..................................................... B60Q 1/00
[52] U.S. Cl. .......................... 362/490; 362/488; 362/479; 362/483; 362/311
[58] Field of Search ..................................... 362/490, 488, 362/479, 483, 311

[56] References Cited

U.S. PATENT DOCUMENTS 5,357,408  10/1994  Lecznar et al. .......................... 362/490
5,582,474  12/1996  Van Order et al. ...................... 362/490

*Primary Examiner*—Thomas M. Sember
*Assistant Examiner*—Ronald E. Delgizzi
*Attorney, Agent, or Firm*—Nixon and Vanderhye P.C.

[57] ABSTRACT

The body and the cover of the conventional automotive lamp assembly used to be made of hard synthetic resin such as polypropylene or polycarbonate having a low Izod impact value. As a result, the strong impact by a human body on the body or the cover of the lamp assembly in a collision accident can create a problem that the lamp assembly is broken into smithereens and recycling thereof was impossible. The automotive lamp assembly installed in the room of a passenger car is provided with means including a body composed of a lamp and a switch to be directly attached to the vehicle body, the body being formed of polypropylene having an Izod impact value of 40 to 60 kJ/m$^2$; and a transparent or translucent cover to shield the body, said cover being formed of polypropylene or polycarbonate having an Izod impact value of 40 to 60 kJ/m$^2$.

5 Claims, 2 Drawing Sheets

AUTOMOTIVE INTERIOR LAMP ASSEMBLY HAVING POLYPROPYLENE BODY, A LAMP AND SWITCH, AND TRANSPARENT/ TRANSLUCENT POLYPROPYLENE AND/OR POLYCARBONATE COVER WITH IZOD IMPACT VALUES

BACKGROUND OF THE INVENTION

The present invention relates to an automotive room lamp assembly to be installed within the passenger compartment of a vehicle, including, for example, a lamp assembly at a central portion of the ceiling, a map lamp in front of the driver's seat, or an reading lamp assembly at the rearward wall of the vehicle. More particularly, the invention relates to an improvement of an automotive room lamp assembly which is formed such that the lamp assembly will not be broken no matter how strong it is impacted.

An automotive room lamp assembly used to be composed of a body attached to the ceiling of a vehicle and so on, a transparent or translucent cover to be detachably attached to said body, said body including a lamp such as a wedge-base bulb and a switch for turning on and off said lamp.

As shown in FIG. 1 and FIG. 2, the body 1 is composed of a lamp case portion 11 attached with a lamp cap 3 holding a lamp 2 and a switch case portion 12 accommodating a switch 4. Said body is formed of a hard synthetic resin including polypropylene or the like.

On the other hand, the transparent or translucent cover 5 detachably attached to said body 1 is composed of a hard synthetic resin including a polycarbonate which is diamond processed in order to diffuse lights from the lamp 2.

In this prior art lamp assembly, said body and the cover 5 are respectively formed of hard synthetic resins including polypropylene or polycarbonate having a low Izod impact value. Therefore, a strong shock inflicted upon the body 1 or the cover 5 by a person in a collision accident can be broken into smithereens which in turn hurts his body whereas such broken lamp cannot be recycled.

SUMMARY OF THE INVENTION

The present invention is aimed at solving such a problem and its object is to provide an automotive room lamp assembly comprising a body formed of a polypropylene having an Izod impact value of 40 to 60 kJ/m$^2$ and a cover of polypropylene or polycarbonate having an Izod impact value of 40 to 60 kJ/m$^2$ such that a strong impact inflicted thereon will not lead to the breakage thereof, thus providing an automotive room lamp assembly which is capable of being recycled.

The automotive lamp assembly to be installed within the passenger compartment of a vehicle including a passenger car, a truck or the like according to the present invention has been made to accomplish the above identified object and includes, as means therefor, a body composed of a lamp and a switch to be directly attached to the vehicle body, said body being formed of polypropylene having an Izod impact value of 40 to 60 kJ/m$^2$; and a transparent or translucent cover to shield said body, said cover being formed of polypropylene or polycarbonate having an Izod impact value of 40 to 60 kJ/m$^2$.

Further, it is preferable that said polypropylene or polycarbonate has an Izod impact value of 42.7 to 60 kJ/m$^2$ or more. It is also preferable that said body and said cover may be a room lamp attached to a central portion of a ceiling of the vehicle body, or a map lamp attached to a forward portion of the ceiling in front of the driver's seat, or a reading lamp attached to a rearward wall of the vehicle.

DETAILED DESCRIPTION OF THE EMBODIMENT

Hereinafter, the embodiments of the automotive room lamp assembly according to the present invention will be explained.

Figure 1:
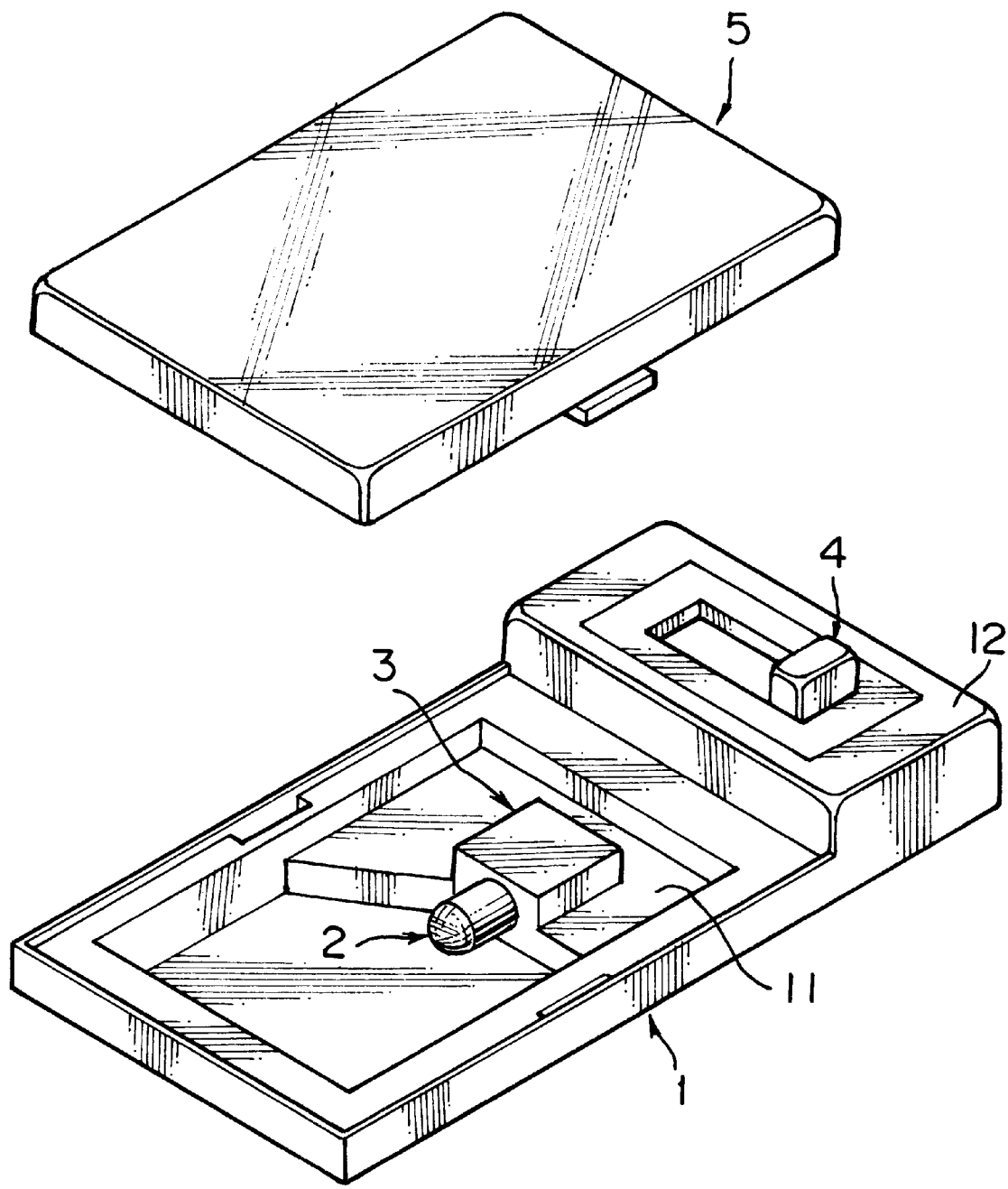
FIG. 1 is an exploded perspective view of the automotive room light assembly according to the present invention.
Figure 2:
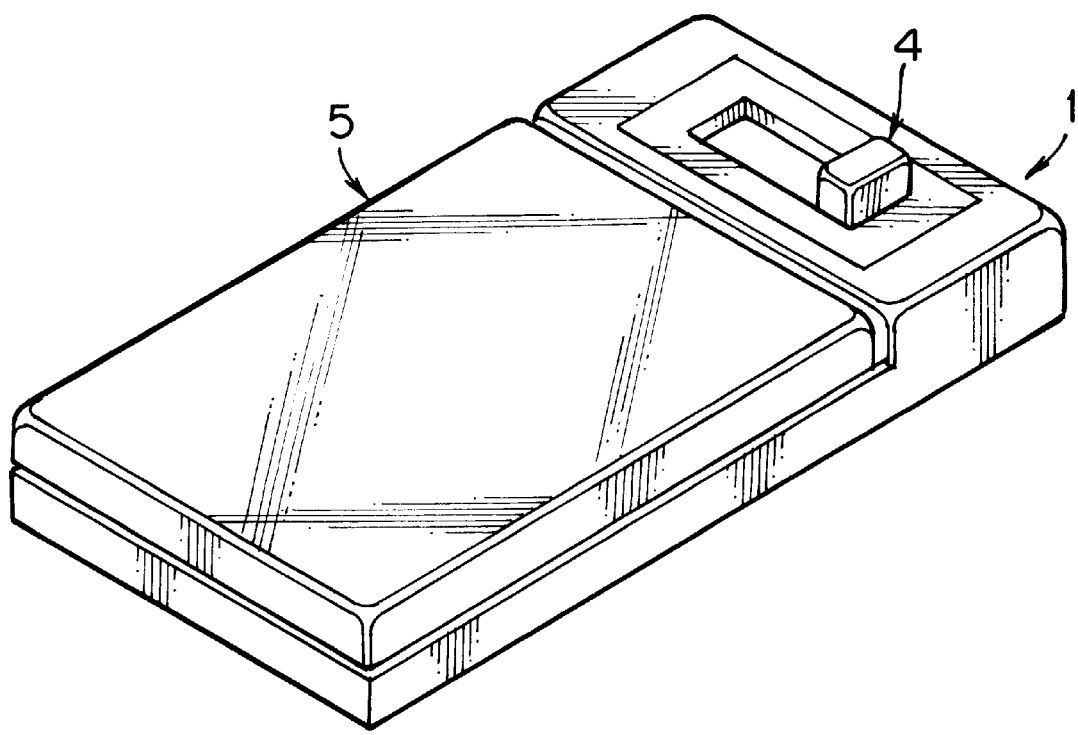
FIG. 2 is a perspective view of the same in an assembled state.

The structure of the automotive indoor lamp assembly of the invention per se is not different from that of the conventionally manufactured and sold ones as shown in FIGS. 1 and 2 while the materials used therein are different from those conventionally used.

In other words, the body 1 is structured of polypropylene having an Izod impact value of 40 to 60 kJ/m$^2$ while the cover 5 is structured of polypropylene or polycarbonate having an Izod impact value of 40 to 60 kJ/m$^2$.

Now, the explanation of the Izod impact value (JIS K 7110) will be given hereinafter.

A specimen of a prescribed size and formed with a prescribed cutout therein is held in cantilever fashion and one free end thereof is given with an impact having a prescribed speed and a breaking energy more than necessary. Then, the energy needed to break the specimen with a single blow is measured to show the impact resistance and toughness of a synthetic resin material, for example, indicating that the more the impact value the specimen is allowed to be given, the higher impact resistance and the higher toughness or resiliency it has.

However, if the Izod shock value the specimen shows is too high, it means that the structure will not be able to maintain a specific shape with the result that it is impossible to manufacture the automotive room lamp assembly of the invention because the coupling power of a plurality of parts to be assembled becomes too weak.

Therefore, the inventor made an extensive research work conducting various experiments to succeed in developing a product which has a sufficient strength and can be assembled easily such that even if a vehicle encounters a collision accident to receive an impact, the hitting on the body 1 or the cover 5 by a human body in a reaction thereof will not break the room lamp assembly into smithereens but merely deforms the portion at which the room lamp assembly was hit while the lamp has a strength as a structure with easiness of assembly.

Polypropylene and polycarbonate having an Izod impact value of 40 to 60 kJ/m$^2$ are selected for this purpose. Further, the body 1 is made of inexpensive material such as polypropylene while the cover is made of highly transparent polycarbonate or, otherwise, polypropylene which is rather insufficient in transparency but inexpensive such that a resultant product are manufactured at a low cost.

In this way, the body 1 of polypropylene having an Izod impact value of 40 to 60 kJ/m$^2$ and the cover 5 of polycarbonate or polypropylene having an Izod impact value of 40 to 60 kJ/m$^2$ are combined into a room lamp assembly of the invention such that a strong impact inflicted on the body 1 or the cover 5 by a human body in a collision accident will not break the body or the cover into smithereens with the result that the driver or the passengers will not be hurt by portions having sharp edges which otherwise might be produced as well as making it possible to recycle the broken lamp.

Now, the collision of the vehicle in motion at a speed of 24 Km/H as most commonly seen in an automobile accident against a stationary object produces an Izod value of 42.7 kJ/m$^2$ on a hit room lamp or the like. Therefore, it is preferable that polypropylene or polycarbonate having an Izod impact value of 42.7 to 60 kJ/m$^2$ is used.

As described in the foregoing, the body and the cover in the invention are formed of polypropylene or polycarbonate having an Izod impact value of 40 to 60 kJ/m$^2$. Therefore, a strong impact thereon will not break the lamp into smithereens but the hit portion thereof merely is deformed with the result that the driver or the passengers are not hurt as well as making it possible to recycle the broken lamp. The invention has a further effect that rather expensive polycarbonate is used only for the cover, thus reducing the general manufacturing cost.

What is claimed is:

1. An automotive lamp assembly for installation within a passenger compartment of a vehicle comprising:

a body adapted for direct attachment to the vehicle, said body including a lamp and a switch for activating the lamp, and being formed of a polypropylene having an Izod impact value of 40 to 60 Kj/m$^2$; and a transparent or translucent cover attached to said body so as to shield said body, said cover being formed of polypropylene or polycarbonate having an Izod impact value of 40 to 60 Kj/m$^2$.

2. An automotive lamp assembly as set forth in claim 1, wherein said polypropylene or polycarbonate has an Izod impact value of 42.7 Kj/m$^2$ to 60 Kj/m$^2$.

3. An automotive lamp assembly as set forth in claim 1, wherein said body and said cover are attached to a central portion of a ceiling of the vehicle.

4. An automotive lamp assembly as set forth in claim 1, wherein said body and said cover are attached to a forward portion of the ceiling in front of the driver's seat.

5. An automotive lamp assembly as set forth in claim 1, wherein said body and said cover are attached to a rearward wall of the vehicle for a reading purpose.

\* \* \* \* \*